(12) United States Patent
Matsumura et al.

(10) Patent No.: US 12,535,872 B2
(45) Date of Patent: Jan. 27, 2026

(54) INTERMITTENTLY OPTIMIZED TURBO BOOST TECHNOLOGY

(71) Applicant: Intel Corporation, Santa Clara, CA (US)

(72) Inventors: Naoki Matsumura, San Jose, CA (US); Merwin Brown, El Dorado Hills, CA (US); Tod Schiff, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 857 days.

(21) Appl. No.: 17/559,918

(22) Filed: Dec. 22, 2021

(65) Prior Publication Data

US 2023/0195198 A1   Jun. 22, 2023

(51) Int. Cl.
*G06F 1/32* (2019.01)
*G06F 1/26* (2006.01)
*G06F 1/3212* (2019.01)
*G06F 1/3234* (2019.01)

(52) U.S. Cl.
CPC ............ *G06F 1/3234* (2013.01); *G06F 1/263* (2013.01); *G06F 1/3212* (2013.01)

(58) Field of Classification Search
CPC .................. G06F 1/32; G06F 9/44; G06F 1/12
See application file for complete search history.

(56) References Cited

U.S. PATENT DOCUMENTS

| | | | |
|---|---|---|---|
| 2008/0005592 A1* | 1/2008 | Allarey | G06F 1/206 713/300 |
| 2019/0204893 A1* | 7/2019 | Rotem | G06F 11/3024 |
| 2022/0083121 A1* | 3/2022 | Khosrowpour | G06F 1/3296 |

OTHER PUBLICATIONS

Intel Corporation, "Turbo Boost Technology 2.0: Higher Performance When You Need It Most", <intel.com/content/www/us/en/architecture-and-technology/turbo-boost/turbo-boost-technology.html>, retrieved on Nov. 9, 2021, 3 pages.

* cited by examiner

*Primary Examiner* — Keshab R Pandey
(74) *Attorney, Agent, or Firm* — Nicholson De Vos Webster & Elliott LLP (57) ABSTRACT

Systems, apparatuses and methods may provide for technology that detects a condition with respect to a system including a processing unit, wherein the processing unit is to include a turbo operation mode and intermittently or regularly shortens a repeated active duration of the turbo operation mode in response to the condition. In one example, intermittently shortening the repeated active duration of the turbo operation mode includes modifying a duration setting a rate of occurrence setting, a power level ratio setting and/or a duty cycle setting.

18 Claims, 8 Drawing Sheets

FIG. 9

INTERMITTENTLY OPTIMIZED TURBO BOOST TECHNOLOGY

TECHNICAL FIELD

Embodiments generally relate to performance management in computing systems. More particularly, embodiments relate to intermittently or regularly optimized turbo boost technology.

BACKGROUND

Turbo boost technology may accelerate processor and graphics performance during peak workloads by automatically allowing processor cores to execute at frequencies higher than the rated operating frequency (e.g., as long as power, current and temperature specification limits are not exceeded). In mobile systems, however, conventional turbo boost solutions may have a negative impact on battery life.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION OF EMBODIMENTS

Figure 1:
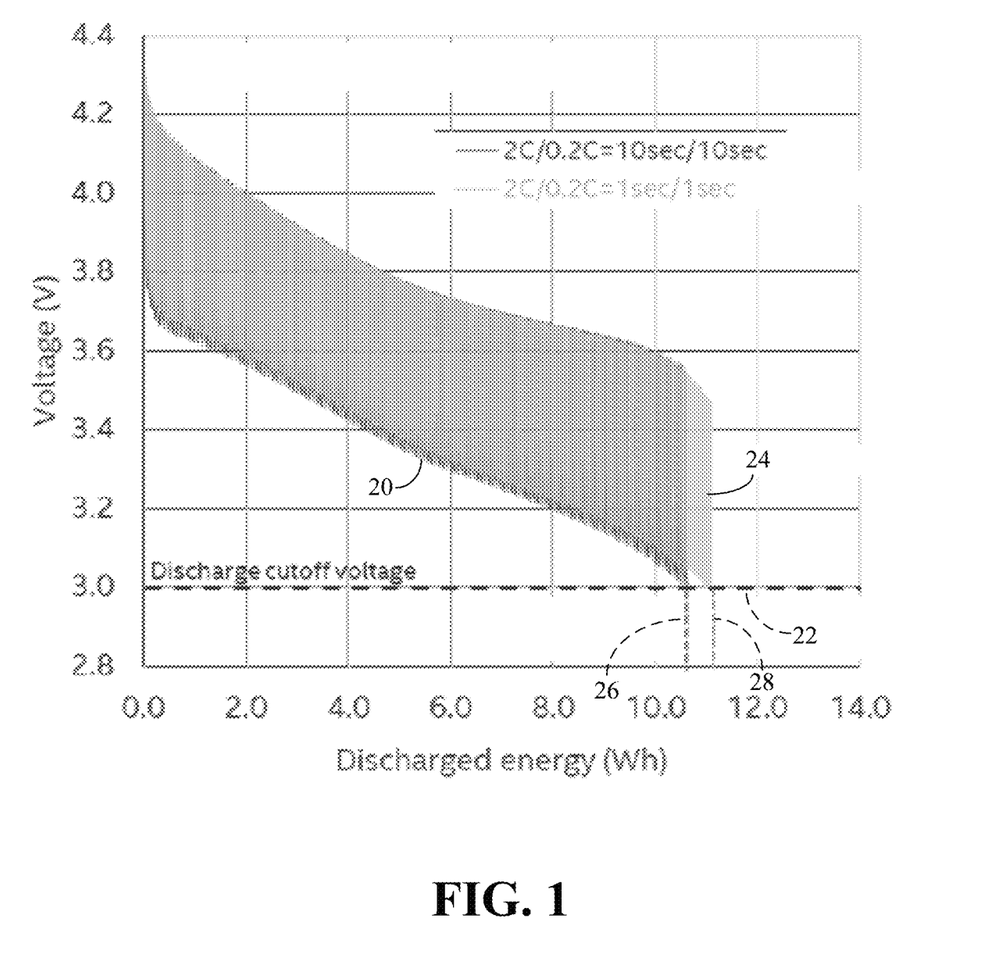
FIG. 1 is a comparative plot of an example of a conventional battery discharge curve and a battery discharge curve according to an embodiment.

Turning now to FIG. 1, a conventional battery discharge curve 20 is shown in which a processing unit (e.g., central processing unit/CPU, host processor, graphics processing unit/GPU, graphics processor) is permitted to execute at an operating frequency (e.g., turbo boost mode) that is higher than the rated operating frequency for relatively long periodic bursts such as, for example, ten seconds (sec). The voltage (e.g., current/I times resistance/R) drop across the battery gradually discharges over time until a cutoff voltage threshold 22 is reached. As a result, a conventional level 26 of discharged energy is achieved before the cutoff voltage threshold 22 is reached.

By contrast, an enhanced battery discharge curve 24 results from embodiments that periodically (e.g., intermittently or regularly) reduce the repeated active duration of the turbo operation mode to relatively short periodic bursts such as, for example, one second. In the illustrated example, the voltage (e.g., IR) drop across the battery discharges more slowly than the voltage drop for the conventional battery discharge curve 20. Accordingly, the enhanced battery discharge curve 24 reaches the cutoff voltage threshold 22 at an enhanced level 28 that is greater than the conventional level 26. Thus, the enhanced battery discharge curve 24 demonstrates that more energy is discharged via the technology described herein. Indeed, embodiments significantly extent battery life while maintaining turbo power.

Figure 2:
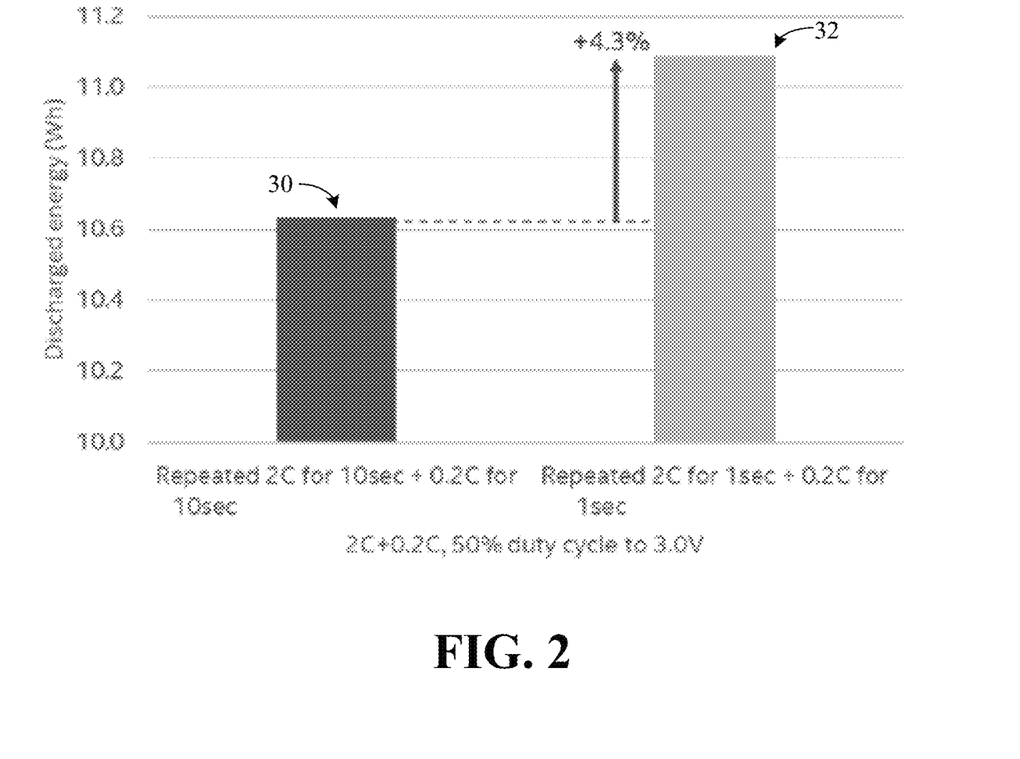
FIG. 2 is a comparative chart of an example of discharged energy for a conventional turbo operation mode and a turbo operation mode according to an embodiment.

FIG. 2 shows charts for a turbo boost solution that repeats the elevated current consumption (e.g., due to a higher operating frequency of the processing unit) at a C-rate (e.g., the rate of discharge as compared to the capacity of the battery) of 2 C (e.g., twice the current that would seemingly go through the rated ampere-hours of the battery in an hour). A conventional chart 30 results from repeating the elevated current consumption for a relatively long duration (e.g., 10 sec) and an enhanced chart 32 results from repeating the elevated current consumption for a relatively short duration (e.g., 1 sec). In the illustrated example, the discharged energy level (e.g., battery life) of the enhanced chart 32 is substantially greater than the discharged energy level of the conventional chart 30.

In general, battery impedance includes R(Ohm) and R(Polarization), where R(Ohm) is the ohmic portion of battery impedance and R(Polarization) is the polarization of battery impedance. When battery discharge starts, the battery voltage drops by I*R(Ohm)+I*R(Polarization), where I is the discharge current. Additionally, I*R(Ohm) responds instantly and does not change substantially. By contrast, I*R(Polarization) increases as discharge continues because R(Polarization) continues to increase to a certain level while discharge continues. Accordingly, the increase in R(Polarization) can be mitigated when the repeated active duration of the turbo operation mode is shortened.

Figure 3:
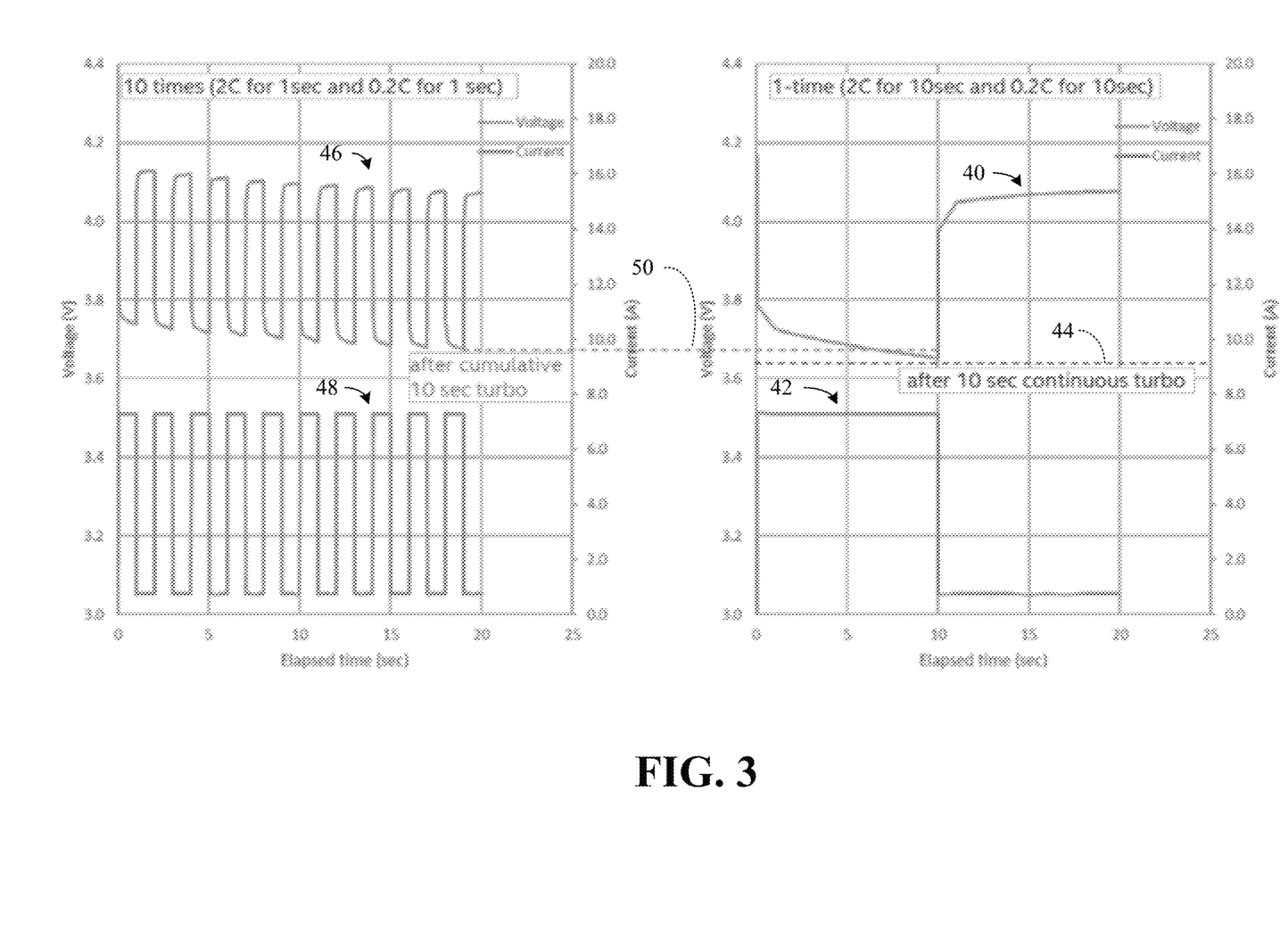
FIG. 3 is a comparative plot of an example of battery voltage curves and battery current curves for a relatively long active duration of a turbo operation mode and a relatively short active duration of a turbo operation mode according to an embodiment.

FIG. 3 shows a conventional battery voltage curve 40 and a conventional battery current curve 42 for a turbo boost solution that conducts an elevated current consumption for a relatively long active duration (e.g., 10 sec). In the illustrated example, the conventional voltage curve 40 drops to a conventional level 44. By contrast, an enhanced battery voltage curve 46 and an enhanced battery current curve 48 result from repeating the elevated current consumption for a relatively short active duration (e.g., 1 sec). As a result, the enhanced voltage curve 46 drops to an enhanced level 50 that is greater than the conventional level 44.

Figure 4:
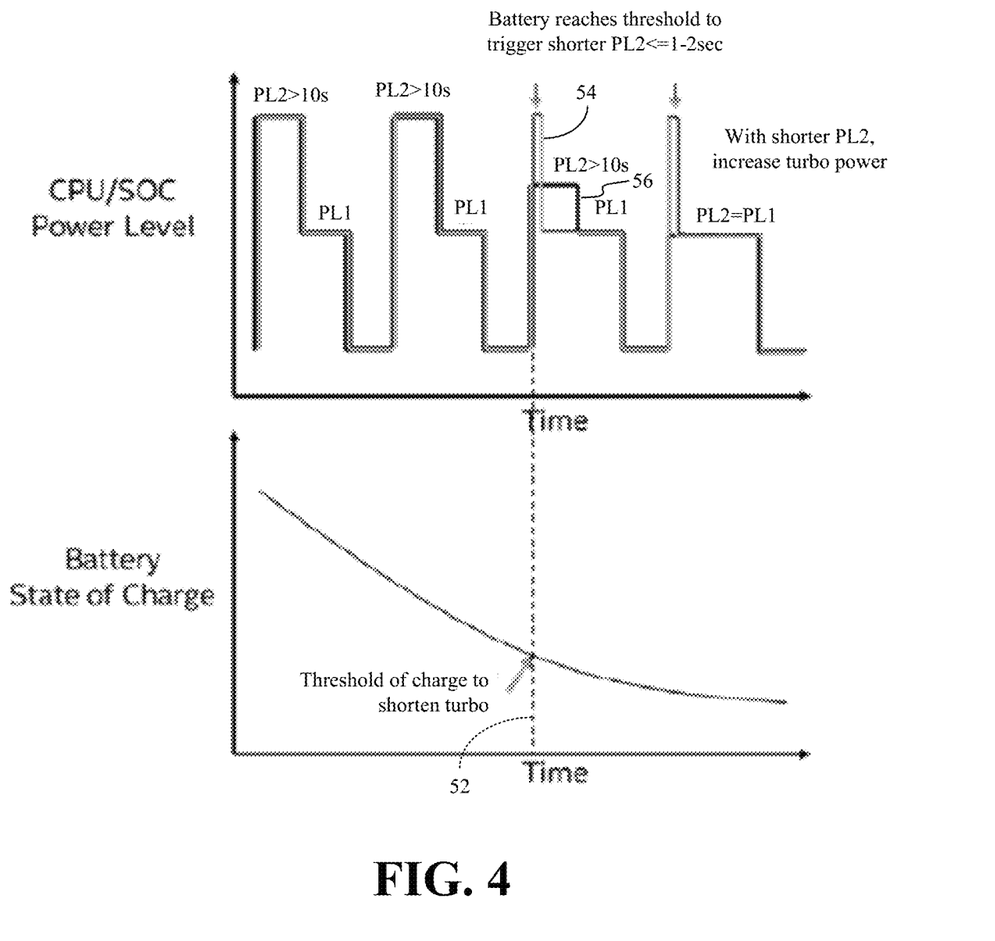
FIG. 4 is a comparative plot of an example of a conventional power level setting and a power level setting according to an embodiment.

FIG. 4 demonstrates that the shorter active duration of the turbo boost mode may be triggered by various conditions such as, for example, the charge level of the battery falling below a threshold at an instance 52 in time. In an enhanced power curve 54, embodiments shorten the repeated active duration of the turbo operation mode when the charge level of the battery falls below the threshold. As a result, a decrease in a higher power level (e.g., power level two/PL2) is minimal after the instance 52. By contrast, a conventional power curve 56 results from a solution that does not shorten the repeated active duration of the turbo operation mode and the decrease in the higher power level is substantial after the instance 52. The enhanced power curve 54 therefore results in better responsiveness. As will be discussed in greater detail, other conditions such as, for example, the presence of a battery power signal (e.g., DYNAMIC BATTERY POWER TECHNOLOGY/DBPT signal), the activation of a user setting (e.g., time of day based on electricity costs, extended battery life mode, workload type), and so forth. For example, before Max Peak Power (MPP) and/or Sustainable Peak Power (SPP) in DBPT decreases at a low state of battery charge, the turbo duration may be adjusted so that the decrease of MPP/SPP can be delayed.

Figure 5:
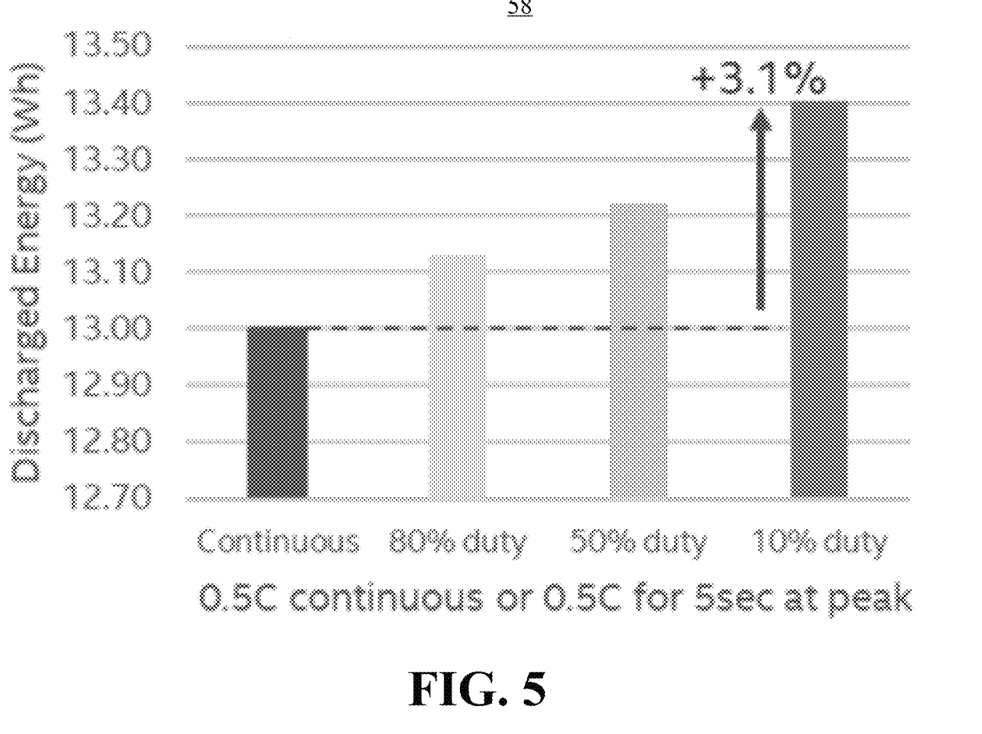
FIG. 5 is a comparative chart of an example of discharged energy for various duty cycle settings according to embodiments.

Turning now to FIG. 5, a chart 58 of discharged energy for various duty cycle settings is shown. In general, battery life with full turbo power can be extended not only by adjusting frequency with the same duty cycle but also by adjusting duty cycle. For example, the chart 58 shows a comparison of discharged battery energy when the battery is discharged under different conditions: continuous 0.5 C; 0.5 C for 5 sec with 80% duty cycle (e.g., 1.25 sec rest); 0.5 C for 5 sec with 50% duty cycle (e.g., 5 sec rest); and 0.5 C for 5 sec with 10% duty cycle (e.g., 45 sec rest). When the duty cycle is decreased, the discharged energy increased significantly (e.g., by 3.1%) because longer rest time leads to more voltage recovery from the IR drop and mitigates the IR drop at the next turbo event (e.g., delaying crossing the discharge cutoff voltage threshold).

Figure 6A:
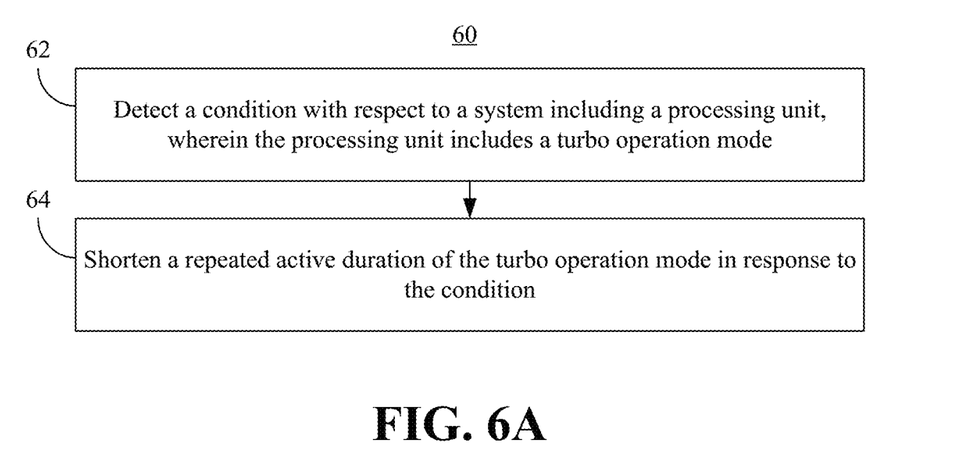
FIGS. 6A and 6B are flowcharts of examples of methods of controlling a turbo operation mode according to embodiments.

FIG. 6A shows a method 60 of controlling a turbo operation mode. The method 60 may be implemented in one or more modules as a set of logic instructions stored in a machine- or computer-readable storage medium such as random access memory (RAM), read only memory (ROM), programmable ROM (PROM), firmware, flash memory, etc., in configurable hardware such as, for example, programmable logic arrays (PLAs), field programmable gate arrays (FPGAs), complex programmable logic devices (CPLDs), in fixed-functionality hardware using circuit technology such as, for example, application specific integrated circuit (ASIC), complementary metal oxide semiconductor (CMOS) or transistor-transistor logic (TTL) technology, or any combination thereof.

The illustrated processing block 62 provides for detecting a condition with respect to a system including a processing unit, wherein the processing unit includes a turbo operation mode (e.g., the ability to execute at frequencies higher than the rated operating frequency as long as power, current and/or temperature specification limits are not exceeded). The system may be, for example, a laptop computer operating on battery power, a laptop computer operating on alternating current (AC) power and battery power, a datacenter with hybrid power (e.g., grid and battery), an electric vehicle (EV), and so forth. Additionally, the processing unit may be a CPU, display panel controller, a display backlight controller, etc. Moreover, the condition may include a charge level of the battery falling below a threshold, an impedance (e.g., polarization impedance) of the battery exceeding a threshold, the presence of a battery power signal (e.g., DBPT signal), an activation of a user setting (e.g., time of day based on electricity costs, extended battery life mode, workload type), etc., or any combination thereof. In one example, the user setting is associated with a duration of a naturally occurring workload. In such a case, block 62 might determine whether the workload is naturally "bursty" (e.g., short) with significant idling periods in between bursts.

Block 64 shortens (e.g., intermittently or regularly) a repeated active duration of the turbo operation mode in response to the condition. In an embodiment, block 64 includes modifying a duration setting, a rate of occurrence setting, a power level ratio (e.g., tau) setting, a duty cycle setting, etc., or any combination thereof. Block 64 may also include lengthening (e.g., intermittently or regularly) a repeated inactive duration of the turbo operation mode in response to the condition. In the case of a bursty workload, block 64 might respond to that workload type by automatically raising the turbo power limit to increase turbo performance. The method 60 therefore enhances performance at least to the extent that intermittently or regularly shortening the repeated active duration of the turbo operation mode maintains turbo power while extending battery life (e.g., delaying the reaching of a discharge cutoff voltage).

Figure 6B:
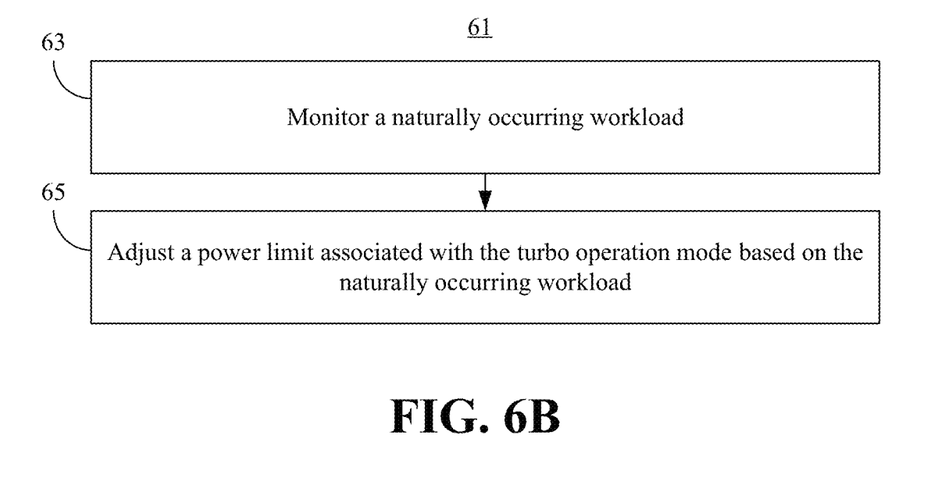

FIG. 6B shows another method 61 of controlling a turbo operation mode. The method 61 may generally be implemented in conjunction with or separately from the method 60 (FIG. 6A), already discussed. More particularly, the method 61 may be implemented in one or more modules as a set of logic instructions stored in a machine- or computer-readable storage medium such as RAM, ROM, PROM, firmware, flash memory, etc., in configurable hardware such as, for example, PLAs, FPGAs, CPLDs, in fixed-functionality hardware using circuit technology such as, for example, ASIC, CMOS or TTL technology, or any combination thereof.

Illustrated processing block 63 provides for monitoring a naturally occurring workload in the system. For example, block 63 might track (e.g., via the duty cycle) the duration and/or frequency of one or more workloads being handled by the system. Block 65 adjusts a power limit (e.g., PL2) associated with the turbo operation mode based on the naturally occurring workload. Thus, block 65 may include reducing the power limit if the workload becomes more sustained (e.g., no longer "bursty" and therefore not meeting the duty cycle requirement). Thus, rather than forcing the duty cycle to allow the higher power limit, the method 61 may enable the power limit to be increased opportunistically whenever the workload behavior is within the appropriate duty cycle.

Figure 7:
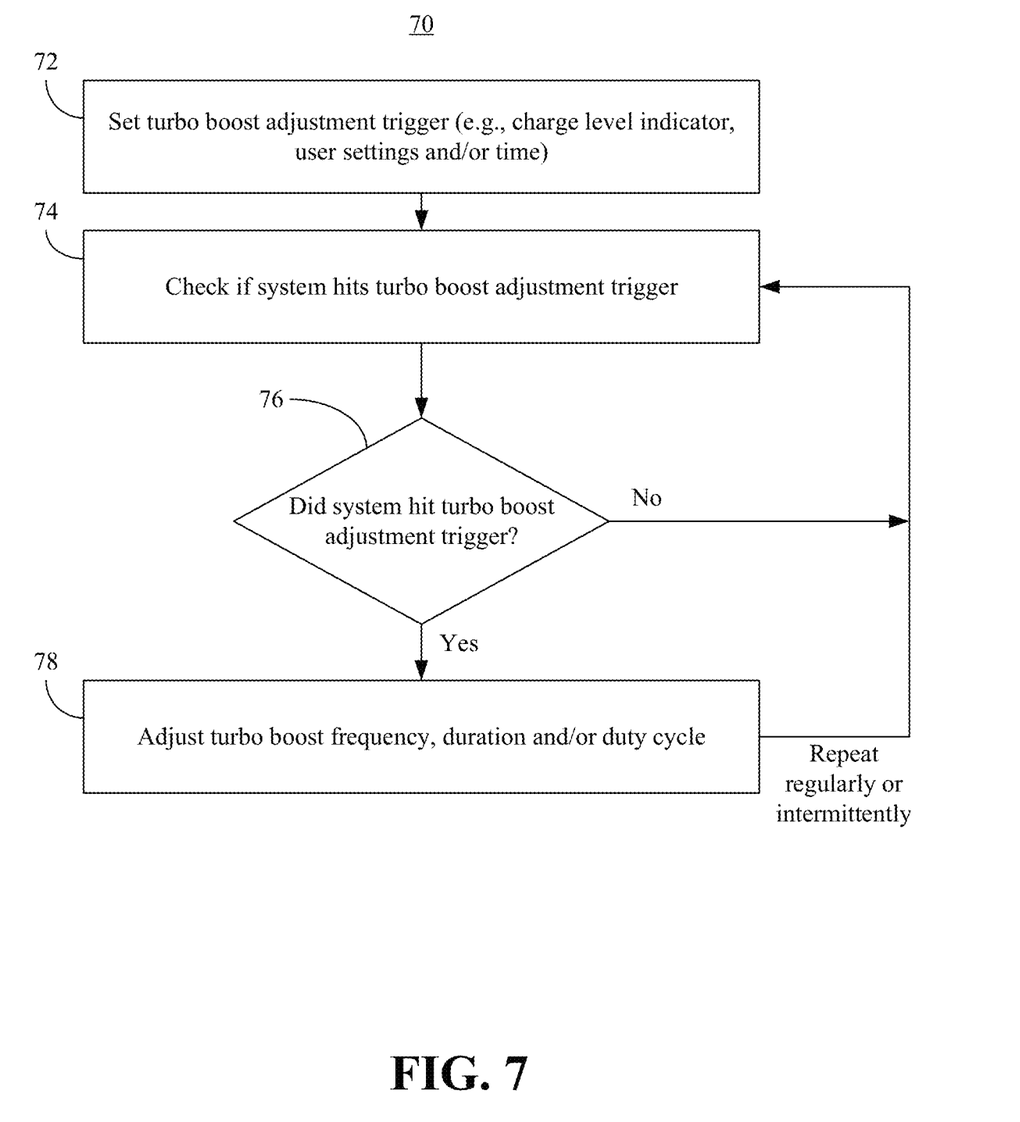
FIG. 7 is a flowchart of an example of a more detailed method of controlling a turbo operation mode according to an embodiment.

FIG. 7 shows a more detailed method 70 of controlling a turbo operation mode. The method 70 may be implemented in one or more modules as a set of logic instructions stored in a machine- or computer-readable storage medium such as RAM, ROM, PROM, firmware, flash memory, etc., in configurable hardware such as, for example, PLAs, FPGAs, CPLDs, in fixed-functionality hardware using circuit technology such as, for example, ASIC, CMOS or TTL technology, or any combination thereof.

Illustrated processing block 72 sets a turbo boost adjustment trigger such as, for example, a charge level indicator, impedance, a user setting and/or a time setting. The charge level indicator includes battery voltage after or before turbo or battery state of charge. Block 74 checks whether the turbo boost adjustment trigger has been activated. If block 76 determines that the turbo boost adjustment trigger has been activated, block 78 adjusts the turbo boost frequency, duration and/or duty cycle. The illustrated method 70 then returns to block 74 on a regular or intermittent basis. If it is determined at block 76 that the adjustment trigger has not been activated, the method 70 returns to block 74 and bypasses block 78.

Figure 8:
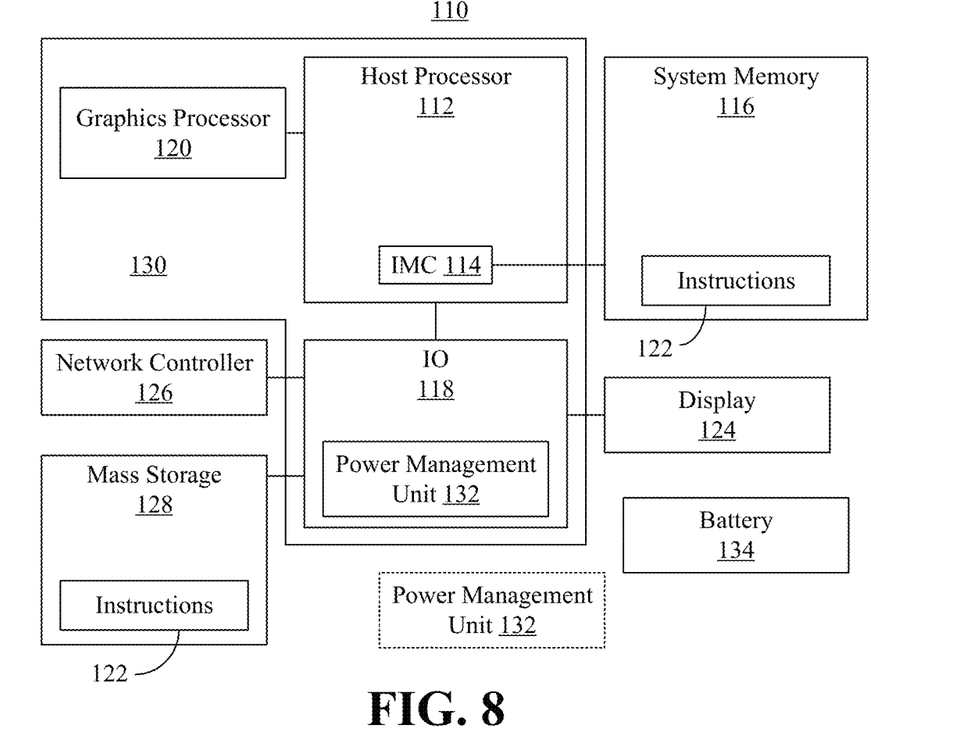
FIG. 8 is a block diagram of an example of a performance-enhanced computing system according to an embodiment.

Turning now to FIG. 8, a performance-enhanced computing system 110 is shown. The system 110 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof.

In the illustrated example, the system 110 includes a host processor 112 (e.g., CPU) having an integrated memory controller (IMC) 114 that is coupled to a system memory 116. In an embodiment, an IO module 118 is coupled to the host processor 112. The illustrated IO module 118 communicates with, for example, a display 124 (e.g., touch screen, liquid crystal display/LCD, light emitting diode/LED display), a network controller 126 (e.g., wired and/or wireless), and a mass storage 128 (e.g., hard disk drive/HDD, optical disc, solid-state drive/SSD, flash memory, etc.). The system 110 may also include a graphics processor 120 (e.g., graphics processing unit/GPU) that is incorporated with the host processor 112 and the IO module 118 into a system on chip (SoC) 130.

In one example, the system memory 116 and/or the mass storage 128 includes a set of executable program instructions 122, which when executed by a power management unit 132 of the IO module 118, cause the power management unit 132 and/or the computing system 110 to implement one or more aspects of the method 60 (FIG. 6A), the method 61 (FIG. 6B) and/or the method 70 (FIG. 7), already discussed. Thus, the power management unit 132 may execute the instructions 122 to detect a condition with respect to the computing system 110, intermittently shorten a repeated active duration of the turbo operation in response to the condition, and intermittently lengthen a repeated inactive duration of the turbo operation mode in response to the condition. The computing system 110 is therefore performance-enhanced at least to the extent that intermittently shortening the repeated active duration of the turbo operation mode maintains turbo power while extending the life of a battery 134 supplying power to the computing system 110 (e.g., delaying the reaching of a discharge cutoff voltage).

Figure 9:
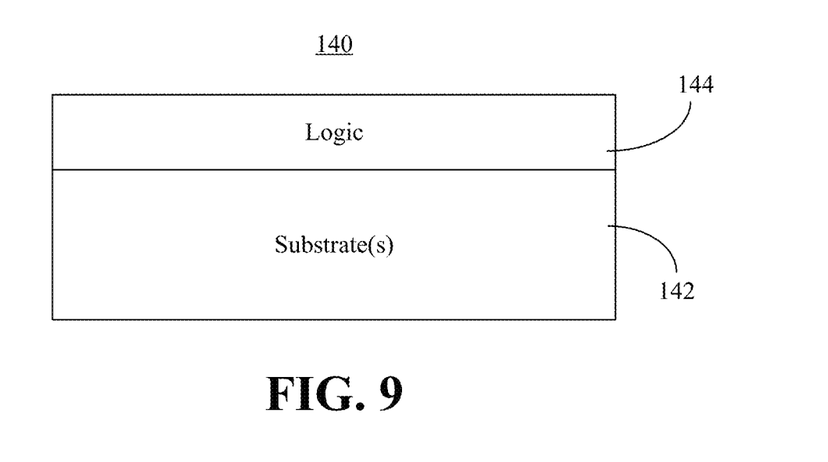
FIG. 9 is an illustration of an example of a semiconductor package apparatus according to an embodiment.

FIG. 9 shows a semiconductor apparatus 140 (e.g., chip and/or package). The illustrated apparatus 140 includes one or more substrates 142 (e.g., silicon, sapphire, gallium arsenide) and logic 144 (e.g., transistor array and other integrated circuit/IC components) coupled to the substrate(s) 142. In an embodiment, the logic 144 implements one or more aspects of the method 60 (FIG. 6A), the method 61 (FIG. 6B) and/or the method 70 (FIG. 7), already discussed. Thus, the logic 144 may detect a condition with respect to a system including a processing unit, wherein the processing unit includes a turbo operation mode and intermittently shorten a repeated active duration of the turbo operation mode in response to the condition.

The logic 144 may be implemented at least partly in configurable or fixed-functionality hardware. In one example, the logic 144 includes transistor channel regions that are positioned (e.g., embedded) within the substrate(s) 142. Thus, the interface between the logic 144 and the substrate(s) 142 may not be an abrupt junction. The logic 144 may also be considered to include an epitaxial layer that is grown on an initial wafer of the substrate(s) 142.

ADDITIONAL NOTES AND EXAMPLES

Example 1 includes a performance-enhanced computing system comprising a power management unit, a processing unit coupled to the power management unit, the processing unit including a turbo operation mode, and a memory including a set of instructions, which when executed by the power management unit, cause the power management unit to detect a condition with respect to the computing system and intermittently shorten a repeated active duration of the turbo operation mode in response to the condition.

Example 2 includes the computing system of Example 1, wherein to shorten the repeated active duration of the turbo operation mode, the instructions, when executed, further cause the power management unit to modify one or more of a duration setting, a rate of occurrence setting, a power level ratio setting or a duty cycle setting.

Example 3 includes the computing system of Example 1, wherein the condition is to include a charge level of a battery in the system falling below a threshold, a presence of a battery power signal, an activation of a user setting or an impedance of a battery in the system exceeding a threshold.

Example 4 includes the computing system of Example 1, wherein the instructions, when executed, further cause the power management unit to monitor a naturally occurring workload and adjust a power limit associated with the turbo operation mode based on the naturally occurring workload.

Example 5 includes the computing system of Example 1, wherein the repeated active duration of the turbo operation mode is to be intermittently or regularly shortened.

Example 6 includes the computing system of any one of Examples 1 to 5, wherein the instructions, when executed, further cause the computing system to lengthen a repeated inactive duration of the turbo operation mode in response to the condition.

Example 7 includes at least one computer readable storage medium comprising a set of instructions, which when executed by a computing system, cause the computing system to detect a condition with respect to the computing system, wherein the computing system is to include a processing unit, and wherein the processing unit is to include a turbo operation mode, and shorten a repeated active duration of the turbo operation mode in response to the condition.

Example 8 includes the at least one computer readable storage medium of Example 7, wherein to shorten the repeated active duration of the turbo operation mode, the instructions, when executed, further cause the computing system to modify one or more of a duration setting, a rate of occurrence setting, a power level ratio setting or a duty cycle setting.

Example 9 includes the at least one computer readable storage medium of Example 7, wherein the condition is to include a charge level of a battery in the computing system falling below a threshold, a presence of a battery power signal, an activation of a user setting or an impedance of a battery in the system exceeding a threshold.

Example 10 includes the at least one computer readable storage medium of Example 7, wherein the instructions, when executed, further cause the computing system to monitor a naturally occurring workload and adjust a power limit associated with the turbo operation mode based on the naturally occurring workload.

Example 11 includes the at least one computer readable storage medium of Example 7, wherein the repeated active duration of the turbo operation mode is to be intermittently or regularly shortened.

Example 12 includes the at least one computer readable storage medium of any one of Examples 5 to 11, wherein the instructions, when executed, further cause the computing system to lengthen a repeated inactive duration of the turbo operation mode in response to the condition.

Example 13 includes a semiconductor apparatus comprising one or more substrates, and logic coupled to the one or more substrates, wherein the logic is implemented at least partly in one or more of configurable or fixed-functionality hardware, the logic to detect a condition with respect to a system including a processing unit, wherein the processing unit is to include a turbo operation mode, and shorten a repeated active duration of the turbo operation mode in response to the condition.

Example 14 includes the semiconductor apparatus of Example 13, wherein to shorten the repeated active duration of the turbo operation mode, the logic is to modify one or more of a duration setting, a rate of occurrence setting, a power level ratio setting or a duty cycle setting.

Example 15 includes the semiconductor apparatus of Example 13, wherein the condition is to include a charge level of a battery in the system falling below a threshold, a presence of a battery power signal, an activation of a user setting or an impedance of a battery in the system exceeding a threshold.

Example 16 includes the semiconductor apparatus of Example 13, wherein the logic is further to monitor a naturally occurring workload and adjust a power limit associated with the turbo operation mode based on the naturally occurring workload.

Example 17 includes the semiconductor apparatus of Example 13, wherein the repeated active duration of the turbo operation mode is to be intermittently or regularly shortened.

Example 18 includes the semiconductor apparatus of any one of Examples 13 to 17, wherein the logic is to lengthen a repeated inactive duration of the turbo operation mode in response to the condition.

Example 19 includes at least one computer readable storage medium comprising a set of instructions, which when executed by a computing system, cause the computing system to monitor a naturally occurring workload, and adjust a power limit associated with the turbo operation mode based on the naturally occurring workload.

Example 20 includes the at least one computer readable storage medium of Example 19, wherein to monitor the naturally occurring workload, the instructions, when executed, cause the computing system to track a duty cycle of the naturally occurring workload.

Example 21 includes the at least one computer readable storage medium of any one of Examples 19 to 20, wherein to adjust the power limit associated with the turbo operation mode, the instructions, when executed, cause the computing system to reduce the power limit if the naturally occurring workload becomes more sustained.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
   a power management unit;
   a processing unit coupled to the power management unit, the processing unit including a turbo operation mode; and
   a memory including a set of instructions, which when executed by the power management unit, cause the power management unit to:
   detect a condition with respect to the computing system, wherein the condition is to include a charge level of a battery in the system falling below a threshold, and
   shorten a repeated active duration of the turbo operation mode in response to the condition.

2. The computing system of claim 1, wherein to shorten the repeated active duration of the turbo operation mode, the instructions, when executed, further cause the power management unit to modify one or more of a duration setting, a rate of occurrence setting, a power level ratio setting or a duty cycle setting.

3. The computing system of claim 1, wherein the condition is also to include a presence of a battery power signal, an activation of a user setting or an impedance of a battery in the system exceeding a threshold.

4. The computing system of claim 1, wherein the instructions, when executed, further cause the power management unit to:
monitor a naturally occurring workload, and
adjust a power limit associated with the turbo operation mode based on the naturally occurring workload.

5. The computing system of claim 1, wherein the repeated active duration of the turbo operation mode is to be intermittently or regularly shortened.

6. The computing system of claim 1, wherein the instructions, when executed, further cause the computing system to lengthen a repeated inactive duration of the turbo operation mode in response to the condition.

7. The at least one non-transitory computer readable storage medium of claim 5, wherein the instructions, when executed, further cause the computing system to lengthen a repeated inactive duration of the turbo operation mode in response to the condition.

8. At least one non-transitory computer readable storage medium comprising a set of instructions, which when executed by a computing system, cause the computing system to:
detect a condition with respect to the computing system, wherein the condition is to include a charge level of a battery in the computing system falling below a threshold, wherein the computing system is to include a processing unit, and wherein the processing unit is to include a turbo operation mode; and
shorten a repeated active duration of the turbo operation mode in response to the condition.

9. The at least one non-transitory computer readable storage medium of claim 7, wherein to shorten the repeated active duration of the turbo operation mode, the instructions, when executed, further cause the computing system to modify one or more of a duration setting, a rate of occurrence setting, a power level ratio setting or a duty cycle setting.

10. The at least one non-transitory computer readable storage medium of claim 8, wherein the condition also is to include a presence of a battery power signal, an activation of a user setting or an impedance of a battery in the system exceeding a threshold.

11. The at least one non-transitory computer readable storage medium of claim 8, wherein the instructions, when executed, further cause the computing system to:
monitor a naturally occurring workload; and
adjust a power limit associated with the turbo operation mode based on the naturally occurring workload.

12. The at least one non-transitory computer readable storage medium of claim 8, wherein the repeated active duration of the turbo operation mode is to be intermittently or regularly shortened.

13. A semiconductor apparatus comprising:
one or more substrates; and
logic coupled to the one or more substrates, wherein the logic is implemented at least partly in one or more of configurable or fixed-functionality hardware, the logic to:
detect a condition with respect to a system including a processing unit, wherein the condition is to include a charge level of a battery in the computing system falling below a threshold, and wherein the processing unit is to include a turbo operation mode; and
shorten a repeated active duration of the turbo operation mode in response to the condition.

14. The semiconductor apparatus of claim 13, wherein to shorten the repeated active duration of the turbo operation mode, the logic is to modify one or more of a duration setting, a rate of occurrence setting, a power level ratio setting or a duty cycle setting.

15. The semiconductor apparatus of claim 13, wherein the condition is also to include a presence of a battery power signal, an activation of a user setting or an impedance of a battery in the system exceeding a threshold.

16. The semiconductor apparatus of claim 13, wherein the logic is further to:
monitor a naturally occurring workload; and
adjust a power limit associated with the turbo operation mode based on the naturally occurring workload.

17. The semiconductor apparatus of claim 13, wherein the repeated active duration of the turbo operation mode is to be intermittently or regularly shortened.

18. The semiconductor apparatus of claim 13, wherein the logic is to lengthen a repeated inactive duration of the turbo operation mode in response to the condition.

* * * * *